United States Patent
Choo

(10) Patent No.: US 6,862,049 B2
(45) Date of Patent: Mar. 1, 2005

(54) LIQUID CRYSTAL DISPLAY DEVICE WITH MINIMUM OHMIC CONTACT BETWEEN REFLECTIVE AND TRANSPARENT ELECTRODES

(75) Inventor: Kyo Seop Choo, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 126 days.

(21) Appl. No.: 09/962,444

(22) Filed: Sep. 26, 2001

(65) Prior Publication Data

US 2002/0036726 A1 Mar. 28, 2002

(30) Foreign Application Priority Data

Sep. 27, 2000 (KR) ........................................ P2000-56618

(51) Int. Cl.⁷ .................... G02F 1/136; G02F 1/1343
(52) U.S. Cl. ............................ 349/44; 349/38; 257/59; 257/72
(58) Field of Search ..................... 349/38, 44, 43; 257/59, 72

(56) References Cited

U.S. PATENT DOCUMENTS 6,583,828 B1 * 6/2003 Wada et al. ................. 349/39
2001/0015777 A1 * 8/2001 Ha ............................. 349/43
2002/0050594 A1 * 5/2002 Kim et al. ................... 257/59

* cited by examiner

Primary Examiner—Howard Weiss

(57) ABSTRACT

An LCD device and a method for manufacturing the same are disclosed, wherein it is possible to reduce an ohmic contact between a reflective electrode and a transparent electrode and to simplify process steps. In the LCD device having first and second substrates and a liquid crystal layer between the first and second substrates, the LCD device includes a gate electrode and a first electrode of a storage capacitor on the first substrate; a first insulating film on the entire surface of the first substrate including the gate electrode; a semiconductor film, source/drain electrodes and a second electrode of the storage capacitor on the first insulating film; a second insulating film on the first insulating film including the source/drain electrodes; a reflective electrode on the second insulating film to connect the drain electrode with the second electrode of the storage capacitor; and a transparent electrode connected with the drain electrode on a third insulating film formed on the second insulating film including the reflective electrode.

17 Claims, 8 Drawing Sheets

LIQUID CRYSTAL DISPLAY DEVICE WITH MINIMUM OHMIC CONTACT BETWEEN REFLECTIVE AND TRANSPARENT ELECTRODES

RELATED APPLICATION

The present application claims the benefit of Korean Patent Application No. P2000-56618 filed Sep. 27, 2000, which is herein fully incorporated by reference.

BACKGROUND OF THE INVENTION

1. Field of the Invention

The present invention relates to a liquid crystal display device, and more particularly, to a method for manufacturing the same.

2. Background of the Related Art

In general, a Cathode Ray Tube (CRT), one of display devices, has been widely used for monitors of information terminals and measuring instruments including a television. However, it was difficult for the CRT to actively adapt to miniaturization and lightweight due to its weight and size.

A Liquid Crystal Display (LCD) device having a thin and small size has been actively developed in order to substitute for such a CRT. Recently, the LCD device is used as a flat panel display device. Thus, a demand of the LCD device is increasing consistently.

Such an LCD device is largely classified into a transmissive LCD device and a reflective LCD device according to a light source. The transmissive LCD device using a back light as the light source can obtain a luminous picture in the dark outside. However, the transmissive LCD device has large size and bulk, and high power consumption due to the back light. The reflective LCD device does not use the back light, thereby obtaining low power consumption, small size and bulk. However, there is a limitation that the reflective LCD device cannot be used in the dark outside.

To solve these problems, a transflective LCD device is disclosed, which can be used as the reflective LCD device or the transmissive LCD device at need.

FIG. 1a and FIG. 1b are plan views of the transflective LCD device according to a related art. As shown in FIG. 1a, a reflective electrode 3 is formed in a pixel region, and then a hole pattern 4 is formed in the reflective electrode 3. In this structure, light partially passes through the hole pattern 4. Or, as shown in FIG. 1b, the reflective electrode 3 is formed at a predetermined portion of the pixel region, and then a transparent electrode 5 is formed in the rest of the pixel region.

Although not described, "1" is a gate line, and "2" is a data line.

A related art LCD device will be described with reference to the accompanying drawings.

FIG. 2 is a sectional view of the related art LCD device. In FIG. 2, the LCD device includes an insulating substrate 11, a gate electrode 13 and a first electrode 13a of a storage capacitor, a gate insulating film 15, a semiconductor film 17 and source/drain electrodes 19 and 19a, a second electrode 19b of the storage capacitor, a first passivation film 21, a reflective electrode 23, a second passivation film 25, and a transparent electrode 29. At this time, the gate electrode 13 and the first electrode 13a of the storage capacitor are formed on the insulating substrate 11. The gate insulating film 15 is formed on the insulating substrate 11 including the gate electrode 13, and then the semiconductor film 17, source/drain electrodes 19 and 19a, and the second electrode 19b of the storage capacitor are formed on the gate insulating film 15. Subsequently, the first passivation film 21 is formed on an entire surface of the gate insulating film 15 including the second electrode 19b, and the reflective electrode 23 is formed on the first passivation film 21. The second passivation film 25 is formed on an entire surface of the first passivation film 21 including the reflective electrode 23. Then, the transparent electrode 29 is connected with the reflective electrode 23 through the second passivation film 25, and is connected with the drain electrode 19a and the second electrode 19b of the storage capacitor through the second passivation film 25 and the first passivation film 21.

A method for manufacturing the LCD device having such structure will be described with reference to FIG. 3a to FIG. 3e.

For reference, a TFT region (I) and a storage region (II) are simultaneously shown in the drawings.

As shown in FIG. 3a, a metal film using Al, Ta, MO or Al alloy is formed on the insulating substrate 11 by sputtering, and is patterned by photolithography, so that the gate electrode 13 is formed in the TFT region (I), and the first electrode 13a of the storage capacitor is formed in the storage region (II). Then, the gate insulating film 15 is formed on the entire surface of the insulating substrate 11 including the gate electrode 13 by chemical vapor deposition (CVD). At this time, the gate insulating film 15 is generally formed of silicon nitride ($SiN_x$) or silicon oxide ($SiO_x$). Although not shown, a gate pad is formed to have some distances with the first electrode 13a of the storage capacitor.

As shown in FIG. 3b, the semiconductor film is formed on the gate insulating film 15 by sputtering, and then is patterned by photolithography, so that the semiconductor film 17 is formed on the gate insulating film 15 above the gate electrode 13. Then, the metal film is formed on the entire surface of the gate insulating film 15 including the semiconductor film 17 by sputtering. Subsequently, source/drain electrodes 19 and 19a are divided on the semiconductor film 17 by photolithography, and the second electrode 19b of the storage capacitor is formed. Although not shown, a data pad is formed on the gate insulating film 15 to have some distances with the second electrode 19b of the storage capacitor.

As shown in FIG. 3c, the first passivation film 21 is formed on the entire surface of the gate insulating film 15 including the second electrode 19b of the storage capacitor by CVD. Then, an aluminum film is formed on the first passivation film 21 by sputtering, and is patterned, thereby forming the reflective electrode 23 on the predetermined portion of the passivation film 21. The second passivation film 25 is formed on the entire surface of the first passivation film 21 including the reflective electrode 23 by CVD.

As shown in FIG. 3d, the first and second passivation films 21 and 25 are selectively removed to expose the surfaces of the drain electrode 19a, the reflective electrode 23 and the second electrode 19b of the storage capacitor, thereby forming contact holes 27a, 27b and 27c.

As shown in FIG. 3e, an indium tin oxide (ITO) film is formed on the surface of the second passivation film 25 including the contact holes 27a, 27b and 27c. Then, the transparent electrode 29 is formed to be electrically connected with the second electrode 19b of the storage capacitor and the reflective electrode 23.

Although not shown, a liquid crystal layer is formed between the insulating substrate 11 and an opposing substrate (not shown), so that manufacturing process steps are completed.

However, the related art LCD device has the following problems.

If the reflective electrode of aluminum is contacted with the transparent electrode of ITO, oxygen of ITO reacts with aluminum. Therefore, an undesired insulating film ($Al_2O_3$) is formed at an interface between the reflective and transparent electrodes 23 and 29. That is, an ohmic contact is remarkably increased in this portion, and then a driving voltage is not uniformly provided to the ITO and the reflective electrode. Accordingly, a parasitic capacitor is formed due to the insulating film formed between the reflective electrode and ITO, thereby resulting in a charged voltage negatively affecting the operation of pixels.

SUMMARY OF THE INVENTION

Accordingly, the present invention is directed to an LCD device and a method for manufacturing the same that substantially obviates one or more of the problems due to limitations and disadvantages of the related art.

An object of the present invention is to provide an LCD device and a method for manufacturing the same that reduces an ohmic contact between a reflective electrode and a transparent electrode and simplifies process steps.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in an LCD device having first and second substrates and a liquid crystal layer between the first and second substrates, the LCD device includes a gate electrode and a first electrode of a storage capacitor on the first substrate; a first insulating film on an entire surface of the first substrate including the gate electrode; a semiconductor film, source/drain electrodes and a second electrode of the storage capacitor on the first insulating film; a second insulating film on the first insulating film including the source/drain electrodes; a reflective electrode on the second insulating film to connect the drain electrode with the second electrode of the storage capacitor; and a transparent electrode connected with the drain electrode on a third insulating film formed on the second insulating film including the reflective electrode.

In another aspect according to the first embodiment of the present invention, in a method for manufacturing an LCD having first and second substrates and a liquid crystal layer between the first and second substrates, the method includes the steps of forming a gate electrode and a first electrode of a storage capacitor on the first substrate; forming a first insulating film on an entire surface of the first substrate including the gate electrode; forming a semiconductor film, source/drain electrodes and a second electrode of the storage capacitor on the first insulating film; forming a second insulating film on the first insulating film including the source/drain electrodes; forming a reflective electrode connected with the drain electrode and the second electrode of the storage capacitor through the second insulating film; forming a third insulating film on the second insulating film including the reflective electrode; and forming a transparent electrode connected with the drain electrode through the second and third insulating films.

In the LCD device and the method for manufacturing the same according to the first embodiment of the present invention, the reflective electrode is not directly connected with the transparent electrode of ITO, so that an undesired insulating film (e.g., $Al_2O_3$) is not formed at an interface between the reflective and transparent electrodes. The transparent electrode is electrically connected with the drain electrode through a hole pattern formed in the reflective electrode.

In still another aspect according to the second embodiment of the present invention, in an LCD device having first and second substrates and a liquid crystal layer between the first and second substrates, the LCD device includes a gate electrode and a first electrode of a storage capacitor on the first substrate; a first insulating film on an entire surface of the first substrate including the gate electrode; a semiconductor film, source/drain electrodes and a second electrode of the storage capacitor on the first insulating film; a second insulating film on the first insulating film including the source/drain electrodes; a reflective electrode on the second insulating film to connect the drain electrode with the second electrode of the storage capacitor through a contact hole; and a transparent electrode connected with the drain electrode on the second insulating film through the contact hole and extended to an upper portion of the reflective electrode.

In further another aspect according to the second embodiment of the present invention, in a method for manufacturing an LCD having first and second substrates and a liquid crystal layer between the first and second substrates, the method includes the steps of forming a gate electrode and a first electrode of a storage capacitor on the first substrate; forming a first insulating film on an entire surface of the first substrate including the gate electrode; forming a semiconductor film, source/drain electrodes and a second electrode of the storage capacitor on the first insulating film; forming a second insulating film on the first insulating film including the source/drain electrodes; forming a reflective electrode connecting the drain electrode with the second electrode of the storage capacitor through the second insulating film; and forming a transparent electrode connected with the drain electrode through the second insulating film and extended to an upper portion of the reflective electrode.

In the LCD device and the method for manufacturing the same according to the second embodiment of the present invention, the reflective electrode is primarily contacted with the drain electrode, and the transparent electrode is contacted with the drain and reflective electrodes without an additional process for forming the insulating film. Accordingly, even though an undesired insulating film may be formed at an interface between the reflective and transparent electrodes, an ohmic contact is not increased between the reflective and transparent electrodes due to equivalent electric potential provided by the drain electrode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

First Embodiment

Figure 1A:
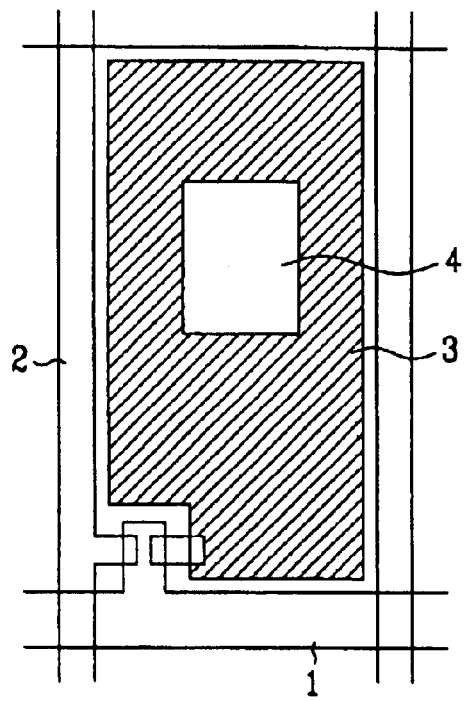
FIG. 1a to FIG. 1b are plan views of a general transflective LCD device.
Figure 1B:
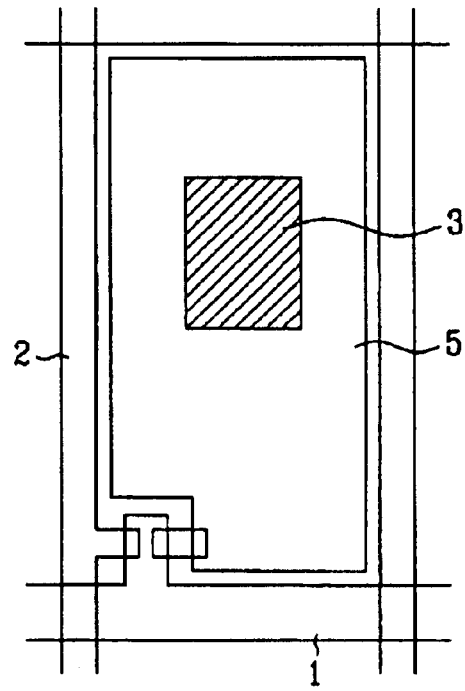
Figure 2:
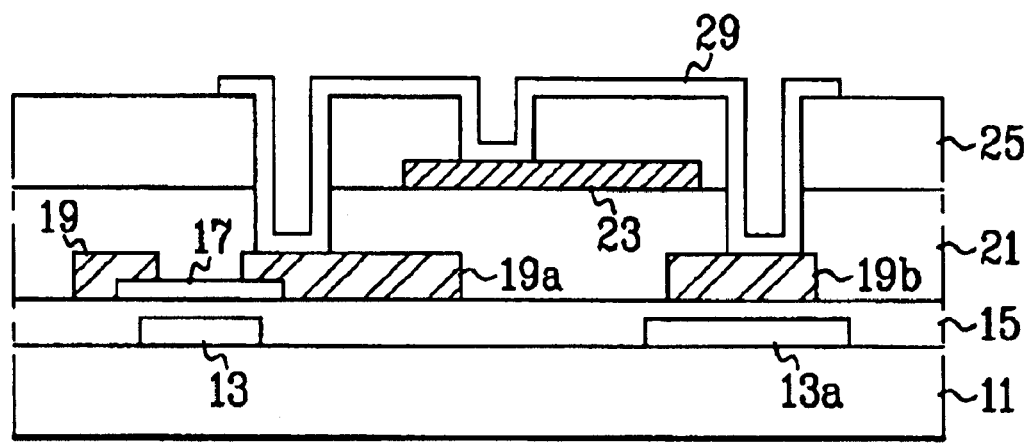
FIG. 2 is a sectional view of a related art LCD device.
Figure 3A:
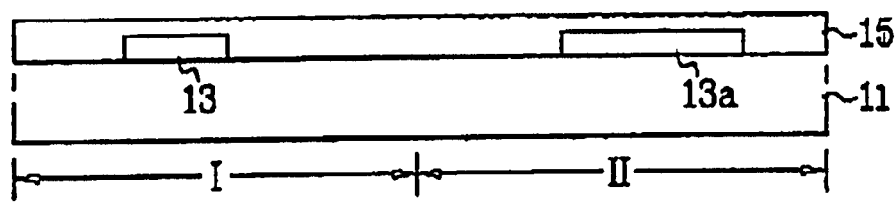
FIG. 3a to FIG. 3e are sectional views showing manufacturing process steps of the related art LCD device.
Figure 3B:
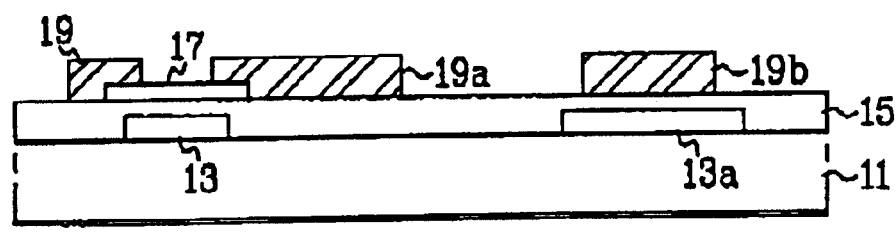
Figure 3C:
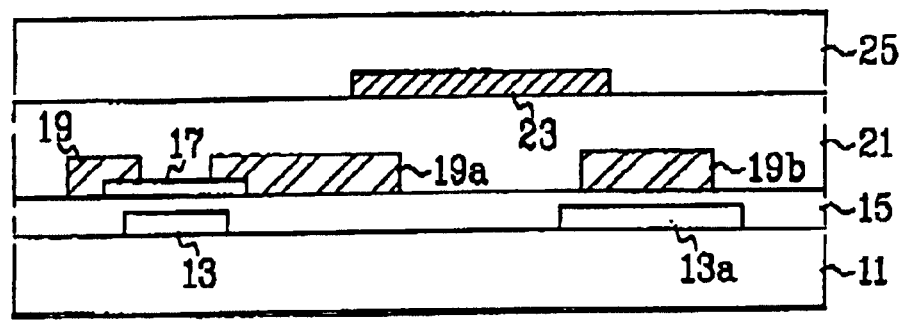
Figure 3D:
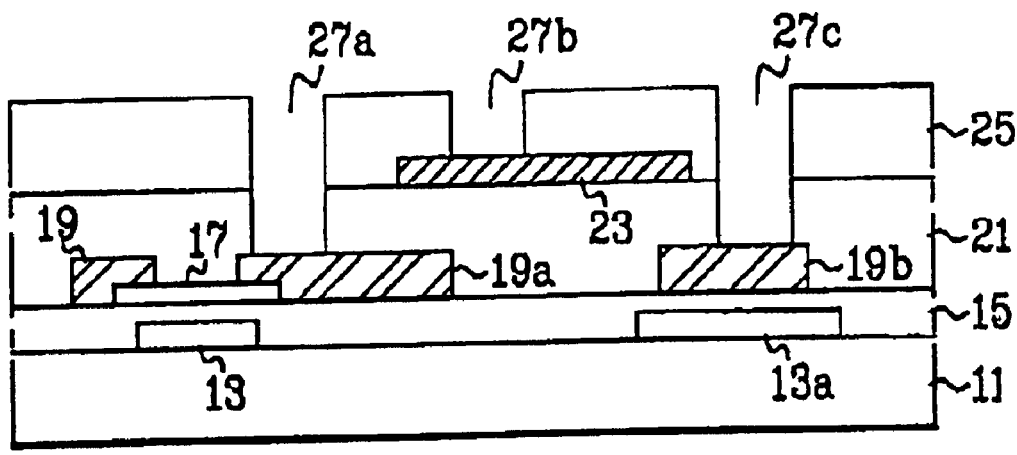
Figure 3E:
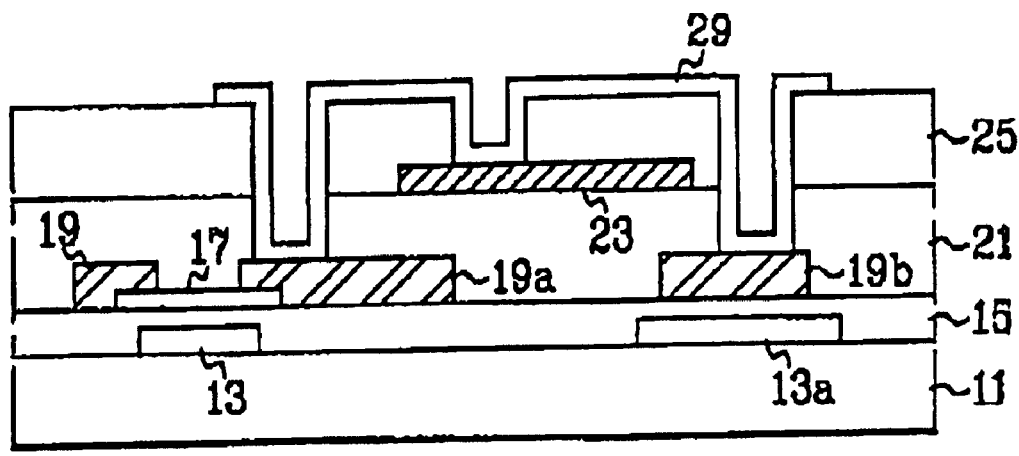
Figure 4:
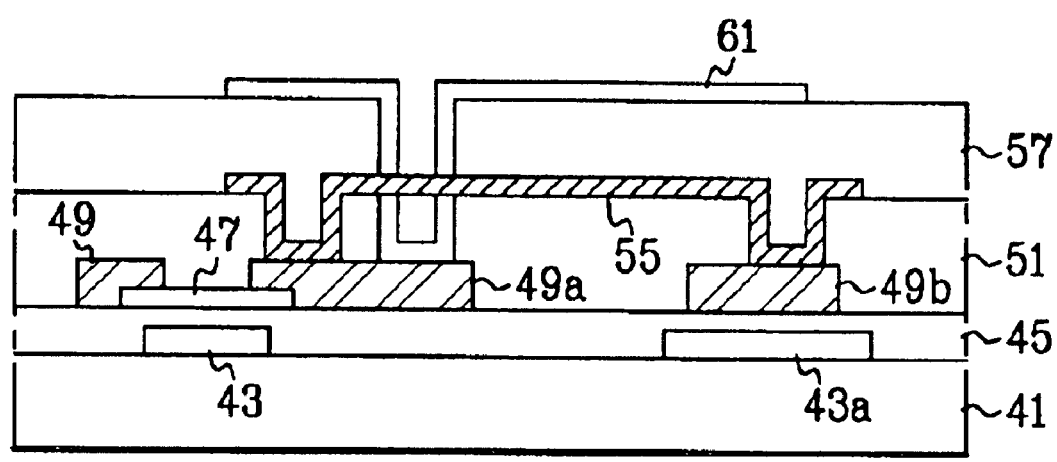
FIG. 4 is a sectional view of the LCD device according to a first embodiment of the present invention.

FIG. 4 is a sectional view showing the structure of an LCD device according to the first embodiment of the present invention. FIG. 5a to FIG. 5d are sectional views showing manufacturing process steps of the LCD device according to the first embodiment of the present invention.

For reference, FIG. 4 and FIG. 5a to FIG. 5d show a TFT region (I) and a storage region (II) simultaneously.

As shown in FIG. 4, a first substrate 41 is formed, and then a gate electrode 43 and a first electrode 43a of a storage capacitor are formed on the first substrate 41 to provide a certain distance between the two electrodes 43 and 43a. A first insulating film 45 is formed on the entire surface of the first substrate 41 including the gate electrode 43. Then, a semiconductor film 47 is formed on the first insulating film 45 above the gate electrode 43, and source/drain electrodes 49 and 49a are formed on the semiconductor film 47. A second electrode 49b of the storage capacitor is formed on the first insulating film 45 above the first electrode 43a of the storage capacitor.

Subsequently, a second insulating film 51 is formed on the first insulating film 45 including the second electrode 49b of the storage capacitor and patterned to define holes 53 through the second insulating film 51. A reflective electrode 55 is formed on the second insulating film 51 to be connected with the drain electrode 49a and the second electrode 49b of the storage capacitor through the second insulating film 51. Then, a third insulating film 57 is formed on the second insulating film 51 including the reflective electrode 55, and patterned to define a hole 59 therethrough. A transparent electrode 61 is formed on the third insulating film 57 to be connected with the drain electrode 49a through the holes 53 and 59 of the third insulating film 57 and the second insulating film 51.

The first insulating film 45 is a gate insulating film, which is formed of a silicon nitride film or a silicon oxide film. The second insulating film 51 and the third insulating film 57 are formed of an organic insulating film, Benzocyclobutene (BCB) or an inorganic insulating film such as SiNx or SiO$_2$.

Although not shown, a liquid crystal layer is formed between the first substrate 41 and a second substrate (not shown).

In the first embodiment of the present invention, the transparent electrode 61 is not directly contacted with the reflective electrode 55 but connected with the drain electrode 49a through the hole pattern that will be formed on the reflective electrode 61. Therefore, an insulating film (e.g., Al$_2$O$_3$) is not formed at an interface between the transparent and reflective electrodes 61 and 55. As a result, an ohmic contact is reduced or is not increased between the two electrodes 61 and 55 and the operational characteristics of the LCD device is improved.

A method for manufacturing the LCD device according to the first embodiment of the present invention will be described.

Figure 5A:
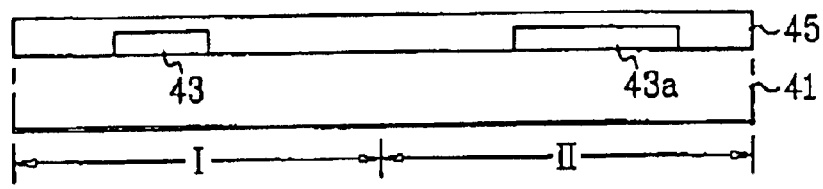
FIG. 5a to FIG. 5d are sectional views showing manufacturing process steps of the LCD device according to the first embodiment of the present invention.

As shown in FIG. 5a, a metal film is formed on the first substrate 41 by sputtering or other existing techniques, and then the gate electrode 43 and the first electrode 43a of the storage capacitor are formed on the first substrate 41 by patterning the metal film. At this time, the metal film is formed of Al, Al alloy, Cr, Mo, Cu, or other known suitable metal materials.

When the first insulating film 45 is formed on the entire surface of the first substrate 41 including the gate electrode 43, the first insulating film 45 acts as a gate insulating film, which is formed of a silicon nitride film or silicon oxide film.

Figure 5B:
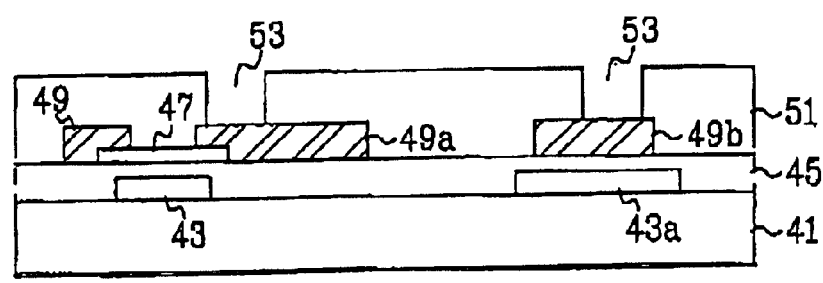

As shown in FIG. 5b, a material layer of amorphous silicon is formed on the first insulating film 45 and then patterned to form the semiconductor layer 47. Then, the metal film is formed on the entire surface of the first insulating film 45 including the semiconductor film 45 by sputtering or other techniques, and is connected with the semiconductor film 47 by patterning the metal film. Subsequently, source/drain electrodes 49 and 49a are divided on the semiconductor film 47, and the second electrode 49b of the storage capacitor is formed on the first insulating film 45 above the first electrode 43a of the storage capacitor. The source/drain electrodes 49 and 49a may be formed of a metal material such as Cu. In case of using Cu as the source/drain electrodes, a barrier film (not shown) is formed to improve the ohmic contact at the interface between the semiconductor film 47 and the source/drain electrodes 49 and 49a.

The second insulating film 51 is formed on the entire surface of the first insulating film 45 including the second electrode 49b of the storage capacitor. The contact hole 53 is formed to expose the drain electrode 49a and the second electrode 49b of the storage capacitor by photolithography. At this time, the second insulating film 51 is formed of an organic film such as BCB, a silicon nitride film, or a silicon oxide film.

Figure 5C:
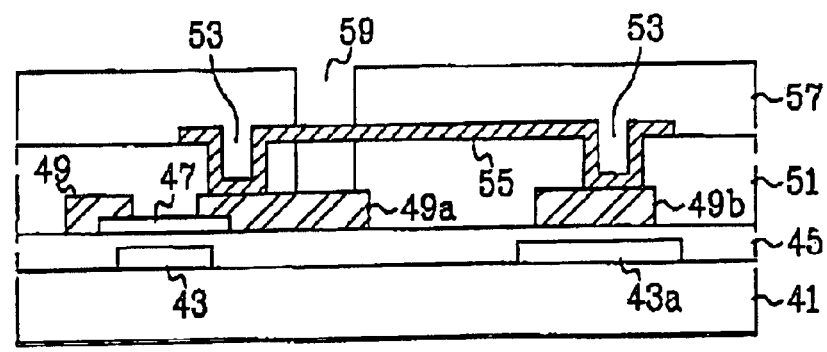

As shown in FIG. 5c, the metal film such as an Al film is formed on the entire surface including the contact hole 53, and then patterned to form the reflective electrode 55, so that the drain electrode 49a is electrically connected with the second electrode 49b of the storage capacitor through the contact hole 53.

Subsequently, the third insulating film 57 is formed on the entire surface of the second insulating film 51 including the reflective electrode 55, and then the third insulating film 57, the reflective electrode 55 and the second insulating film 51 are selectively removed to expose the drain electrode 49a, thereby forming the contact hole 59.

Figure 5D:
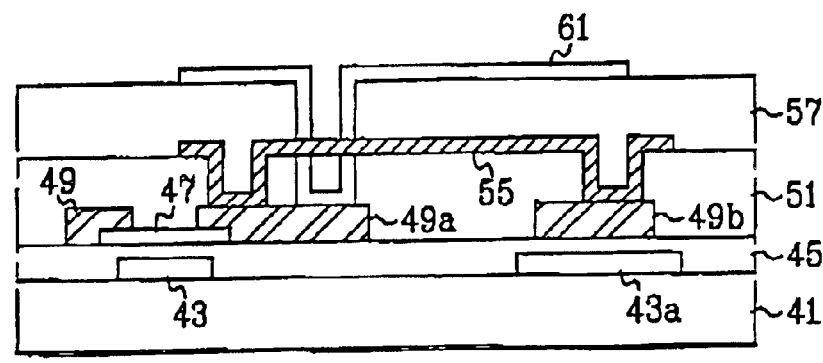

As shown in FIG. 5d, the transparent electrode 61 of an indium tin oxide (ITO) is formed to be connected with the drain electrode 49a through the contact hole 59. At this time, the third insulating film 57 is formed of an organic insulating film such as BCB or an inorganic insulating film such as a silicon film, a silicon nitride film, or a silicon oxide film.

Although not shown, a second substrate is formed in the opposite to the first substrate 41. Then, a liquid crystal film is formed between the first and second substrates, so that the process steps for manufacturing the LCD device according to the first embodiment of the present invention are completed.

In the first embodiment of the present invention, the transparent electrode 61 is not directly connected with the reflective electrode 55 and is not flush with the reflective electrode 55. Therefore, an insulating film is not formed at the interface between the two electrodes 55 and 61.

Figure 6:
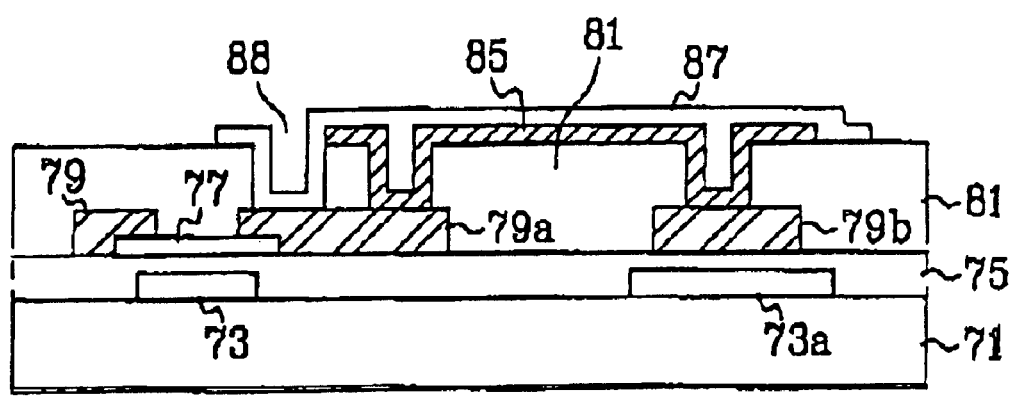
FIG. 6 is a sectional view of the LCD device according to a second embodiment of the present invention.

That is, the transparent electrode 61 is electrically connected with the drain electrode 55 below the reflective electrode 55 through the hole pattern formed on the reflective electrode 55, so that the transparent electrode 61 and the reflective electrode 55 can be formed in different surfaces.
Second Embodiment FIG. 6 is a sectional view of an LCD device according to a second embodiment of the present invention. FIG. 7a to FIG. 7d are sectional views showing manufacturing process steps of the LCD according to the second embodiment of the present invention, which show a TFT region (I) and a storage region (II) simultaneously.

As shown in FIG. 6, in the LCD device according to the second embodiment of the present invention, a first substrate 71 is formed, and then a gate electrode 73 and a first electrode 73a of a storage capacitor are formed on the first substrate 71 to prove a certain distance between the two electrodes 73 and 73a. A first insulating film 75 is formed on the entire surface of the first substrate 71 including the gate electrode 73 and the first electrode 73a. Then, a semiconductor film 77 is formed on the first insulating film 75 above the gate electrode 73, and source/drain electrodes 79 and 79a are formed on the semiconductor film 77. A second electrode 79b of the storage capacitor is formed on the first insulating film 75 above the first electrode 73a of the storage capacitor.

Subsequently, a second insulating film 81 is formed on the entire surface of the first insulating film 75 including the second electrode 79b of the storage capacitor. A reflective electrode 85 is formed in contact with the drain electrode 79a and the second electrode 79b of the storage capacitor through the second insulating film 81. A transparent electrode 87 is in contact with the drain electrode 79a through the second insulating film 81 and is extended to the upper portion of the reflective electrode 85.

In the second embodiment of the present invention, the reflective electrode 85 is primarily in contact with the drain electrode 79a, and the transparent electrode 87 is in contact with the drain electrode 79a and the reflective electrode 85. In this case, even though an undesired insulating film (e.g., $Al_2O_3$) may be formed at the interface between the reflective electrode 85 and the transparent electrode 87, the reflective electrode 85 and the transparent electrode 87 are connected directly with the drain electrode 79a, thereby obtaining an equivalent electric potential by the drain electrode 79a. Accordingly, an ohmic contact between the reflective electrode 85 and the transparent electrode 87 is reduced or is not increased.

A method for manufacturing the LCD device according to the second embodiment of the present invention will be described with reference to FIG. 7a to FIG. 7d.

Figure 7A:
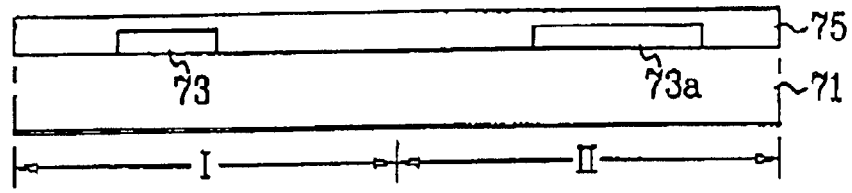
FIG. 7a to FIG. 7d are sectional views showing manufacturing process steps of the LCD device according to the second embodiment of the present invention.

As shown in FIG. 7a, a metal film is formed on the first substrate 71 by sputtering or other techniques, and then the gate electrode 73 and the first electrode 73a of the storage capacitor are formed on the first substrate 71 by patterning the metal film. At this time, the metal film can be formed of Al, Al alloy, Cr, Mo, Cu or other known suitable metals.

Subsequently, the first insulating film 75 is formed on the entire surface of the first substrate 71 including the gate electrode 73. The first insulating film 75 is a gate insulating film, which can be formed of a silicon nitride film or silicon oxide film.

Figure 7B:
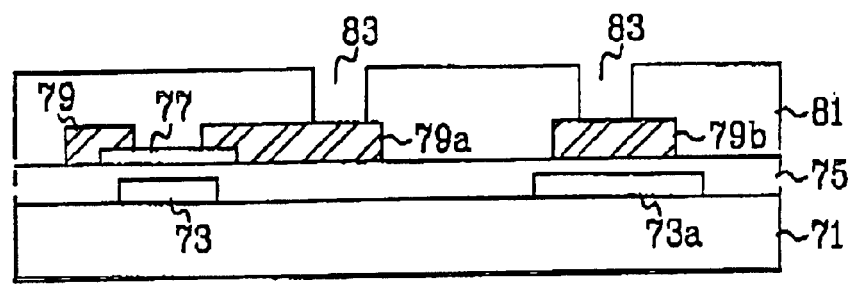

As shown in FIG. 7b, a semiconductor material layer made of, e.g., amorphous silicon is formed on the first insulating film 75 and then patterned to form the semiconductor film 77. Then, a metal film is formed on the entire surface of the first insulating film 75 including the semiconductor film 77 by sputtering or other processes, and is connected with the semiconductor film 77. Subsequently, the metal film is patterned so that source/drain electrodes 79 and 79a are formed on the semiconductor film 77, and the second electrode 79b of the storage capacitor is formed on the first insulating film 75 above the first electrode 73a of the storage capacitor.

The second insulating film 81 is formed on the entire surface of the first insulating film 75 including the second electrode 79b of the storage capacitor, and patterned by photolithography or other processes so that contact holes 83 are formed to expose the drain electrode 79a and the second electrode 79b of the storage capacitor.

At this time, the source/drain electrodes 79 and 79a may be formed of Cu or other known materials. In case of using the Cu as source/drain electrodes, a barrier film (not shown) is formed to improve the ohmic contact at the interfaces between the semiconductor film 77 and the source/drain electrodes 79 and 79a. The second insulating film 81 is formed of the organic insulating film such as BCB or an inorganic insulating film such as a silicon film, a silicon nitride film, or a silicon oxide film.

Figure 7C:
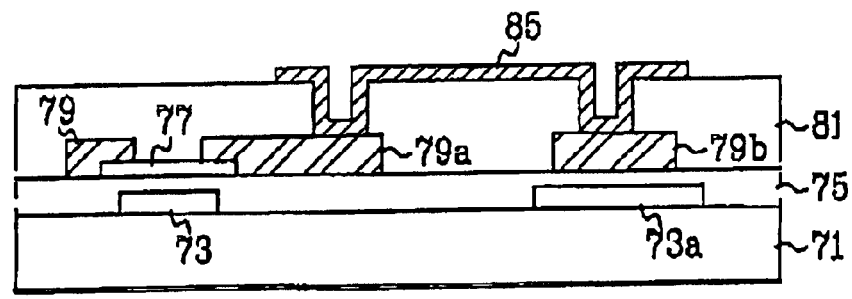

As shown in FIG. 7c, the metal film made of, e.g., Al is formed on the entire surface including the contact holes 83, and then patterned to form the reflective electrode 85, which is electrically connected with the drain electrode 79a and the second electrode 79b of the storage capacitor through the contact holes 83.

Figure 7D:
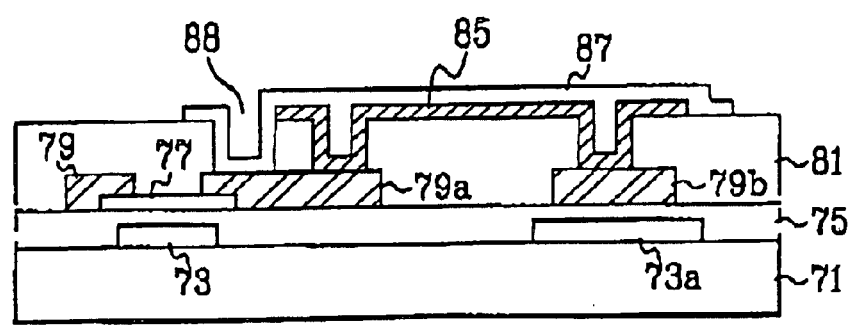

As shown in FIG. 7d, a contact hole 88 is formed by removing a predetermined portion of the second insulating film 81 adjacent to the reflective electrode 85 to expose the drain electrode 79a. Then, an ITO is formed on the entire surface of the second insulating film 81 including the contact hole 88, and then patterned to form the transparent electrode 87, which is in contact with the drain electrode 79a and extended over an upper portion of the reflective electrode 85.

Although not shown, a second substrate is formed opposite to the first substrate 71. Then, a liquid crystal film is formed between the first and second substrates, so that the process steps for manufacturing LCD device according to the second embodiment of the present invention are completed.

As aforementioned, the LCD device of the present invention has many advantages including the following.

First, in some embodiments, the reflective electrode is not directly contacted with the transparent electrode, so that an undesired insulating film is not formed at the interface between the reflective and transparent electrodes. Therefore, the present invention prevents an increase of the ohmic contact at the interface portion.

Furthermore, in other embodiments, the reflective electrode is primarily in contact with the drain electrode, and the transparent electrode is in contact with the drain electrode and the reflective electrode. In this event, even though an undesired insulating film ($Al_2O_3$) may be formed at the interface between the reflective electrode and the transparent electrode, the reflective electrode and the transparent electrode are in contact with the drain electrode, thereby establishing an equivalent electric potential by the operation of the drain electrode. Accordingly, the present invention minimizes ohmic contact between the reflective electrode and the transparent electrode.

The forgoing embodiments are merely exemplary and are not to be construed as limiting the present invention. The present teachings can be readily applied to other types of apparatuses, methods and systems. The description of the present invention is intended to be illustrative, and not to limit the scope of the claims. Many alternatives, modifications, and variations will be apparent to those skilled in the art.

What is claimed is:

1. A liquid crystal display (LCD) device comprising:
   a gate electrode and a first electrode of a storage capacitor on a substrate;
   a first insulating film on an entire surface of the first substrate including the gate electrode;
   a semiconductor film, source/drain electrodes and a second electrode of the storage capacitor on the first insulating film;
   a second insulating film on the first insulating film including the source/drain electrodes;
   a reflective electrode on the second insulating film to connect the drain electrode with the second electrode of the storage capacitor;
   a third insulating film on the second insulating film including the reflective electrode; and
   a transparent electrode connected with the drain electrode through the third insulating film.

2. The LCD device as claimed in claim 1, wherein the first insulating film is a gate insulating film.

3. The LCD device as claimed in claim 1, wherein the transparent electrode includes ITO.

4. The LCD device as claimed in claim 1, wherein the reflective electrode is made of a metal film.

5. The LCD device as claimed in claim 1, wherein an ohmic contact between the transparent electrode and the reflective electrode is reduced or not increased.

6. A liquid crystal display (LCD) device comprising:
   a gate electrode and a first electrode of a storage capacitor on a substrate;
   a first insulating film on an entire surface of the first substrate including the gate electrode;
   a semiconductor film, source/drain electrodes and a second electrode of the storage capacitor on the first insulating film;
   a second insulating film on the first insulating film including the source/drain electrodes and having first and second contact holes;
   a reflective electrode on the second insulating film to connect the drain electrode with the second electrode of the storage capacitor through the first contact hole; and
   a transparent electrode connected with the drain electrode formed on the second insulating film through the second contact hole, the transparent electrode covering an upper portion of the reflective electrode.

7. The LCD device as claimed in claim 6, wherein the first insulating film is a gate insulating film.

8. The LCD device as claimed in claim 6, wherein the transparent electrode includes ITO.

9. The LCD device as claimed in claim 6, wherein the reflective electrode is made of a metal film.

10. The LCD device as claimed in claim 6, wherein an ohmic contact between the transparent electrode and the reflective electrode is reduced or not increased.

11. A display device comprising;
    a source/drain electrode and a storage capacitor formed on a substrate;
    a second insulating film formed over the substrate to expose portions of the source/drain electrode and an electrode of the storage capacitor so as to define first and second contact holes through the second insulating film;
    a reflective electrode in contact with the source/drain electrode through the first contact hole and in contact with the electrode of the storage capacitor through the second contact; and
    a transparent electrode formed on the substrate.

12. The display device of claim 11, further comprising:
    a third insulating film formed on the substrate to expose another portion of the source/drain electrode through a third contact hole, wherein the transparent electrode contacts the source/drain electrode through the third contact hole.

13. The display device of claim 12, wherein the transparent electrode does not contact the reflective electrode.

14. The display device of claim 11, wherein the second insulating film further includes a third contact hole for exposing a different portion of the source/drain electrode and the transparent electrode is in contact with the source/drain electrode through the third contact hole.

15. The display device of claim 14, wherein the transparent electrode is in contact with the reflective electrode and covers the reflective electrode.

16. The display device of claim 11, further comprising:
    a gate electrode formed on the substrate;
    a gate insulating layer covering the gate electrode and another electrode of the storage capacitor; and
    a semiconductor film formed on the gate insulating layer.

17. The display device of claim 11, wherein an ohmic contact between the transparent electrode and the reflective electrode is reduced or not increased.

* * * * *